United States Patent
Kuo et al.

(10) Patent No.: US 7,216,559 B2
(45) Date of Patent: May 15, 2007

(54) GUIDE ACTUATOR WITH HIGH RADIAL DIRECTION LOAD CAPACITY

(75) Inventors: Chang-Hsin Kuo, Taichung (TW); Tung-Hsin Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 634 days.

(21) Appl. No.: 10/758,195

(22) Filed: Jan. 16, 2004

(65) Prior Publication Data

US 2004/0184683 A1   Sep. 23, 2004

Related U.S. Application Data

(63) Continuation-in-part of application No. 10/086,433, filed on Mar. 4, 2002, now abandoned.

(51) Int. Cl.
*F16H 27/02* (2006.01)

(52) U.S. Cl. ............... 74/89.32; 74/424.82; 74/424.83

(58) Field of Classification Search ............ 74/89.32, 74/424.81, 424.82, 424.83
See application file for complete search history.

(56) References Cited

U.S. PATENT DOCUMENTS

| | | | | |
|---|---|---|---|---|
| 4,630,872 A | * | 12/1986 | Teramachi | 384/45 |
| 5,013,164 A | * | 5/1991 | Tsukada | 384/45 |
| 5,145,261 A | * | 9/1992 | Narumiya | 384/45 |
| 5,158,372 A | * | 10/1992 | Ueki | 384/45 |
| 5,431,498 A | * | 7/1995 | Lyon | 384/45 |
| 2004/0184683 A1 | * | 9/2004 | Kuo et al. | 384/7 |

* cited by examiner

*Primary Examiner*—David M. Fenstermacher
(74) *Attorney, Agent, or Firm*—Rosenberg, Klein & Lee

(57) ABSTRACT

The present invention relates to a new guide actuator with high radial direction load capability, which has the purpose of providing a directional force bearing way to common loading method to make the actuator can bear load and transmit with higher accuracy. On design, the present invention has grooves bearing load at the center of the bottom of the U-shape guide structure, and a table is set between two inner side walls of the U-shape guide structure, grooves corresponding to the grooves of the U-shape guide structure being set at the bottom of the table, rollers being set between grooves and grooves to make the table and the U-shape guide structure slide respect to each other with very low friction due to rolling motion of the rollers with high radial load capability.

5 Claims, 6 Drawing Sheets

GUIDE ACTUATOR WITH HIGH RADIAL DIRECTION LOAD CAPACITY

CROSS-REFERENCES TO RELATED APPLICATIONS

The present invention is a Continuation-in-part (CIP) application of a pending non-provisional patent application with application Ser. No. 10/086,433 filed Mar. 4, 2002 now abandoned.

BACKGROUND OF THE INVENTION

1. Field of the Invention

The present invention relates to a guide actuator fit to be applied on machining tools, robotics, electrical equipments and automation industry, and so on, especially to a new one having U-shape guide structure and enabling to bear higher radial load.

2. Description of the Prior Art

Commonly known linear guide actuators are mainly composed of a pair of parallel linear slide rails fastened on an assistant frame, a movable table locked on a table of the linear slide rail, and a screw or a belt used as an actuating structure to drive the table to move back and forth (as U.S. Pat. No. 5,598,043). The assistant frame is usually made of cast iron, but it is more difficult in manufacturing process and more expensive in cost. Therefore, some designs are made of extruded aluminum for reducing cost. The aluminum material is soft enough to be extruded as every kind of shape to reduce process cost. However, aluminum has low stiffness such that linearity and parallelism are relatively more unstable. In this way, it is essential to adjust carefully and pay more attention to the assembling geometry precision.

FIG. 6 is a prior improved design (U.S. Pat. Nos. 5,273,381 and 5,277,498). The design uses a U-shape guide structure (1) made of iron and steel but not linear slide rails and an assistant frame. A pair of grooves (16) are respectively set at the inner walls of two sides of the U-shape guide structure, and there are steel balls (8) set in the grooves to guide the table (2) slide directly along the grooves (16) of the guide structure. Because the U-shape guide structure is made of steel and iron, the design has better intensity. Besides, the structure of the design is simple such that time and requirement of experience of users for assembly are reduced. However, when the improved design bears weight, or withstands a downward force (as F shown in the figure), both walls of two sides of the U-shape guide structure would spread out slightly due to withstanding steel balls such that the table (2) slightly descend. Therefore, the precision of the guide actuator is lowered to affect the stiffness of the mechanism and positioning accuracy. Unfortunately, most guide actuators are set in this way, including the single axis type and two axes type, X-Y actuator. The X-Y actuator according to this way bears force from upside to underside. As long as the mechanism on the table is too heavy or the table bears too much load downward, the precision of the actuator would be affected obviously. Moreover, the actuator may bears too heavy load to be destroyed.

Besides, there is another type of transmission mechanism such as one disclosed by U.S. Pat. No. 4,659,238 by the name of "Linear Guideway". It is essentially installing a block on a rail, then afterwards fasten a table onto the block such that the table is movable with respect to the rail. Since the rail provided in this case is designed to configure into a narrow, elongated small cross section element whose cross sectional moment of inertia is very small, the rail is apt to be distorted and flexed causing inconvenient to assemble. Moreover, the planarity of the base entraining the mechanism greatly affects the parallelism of table movement. Because the actuating means is not included in this prior art so that an extra actuating means must be required to connect with the block thereby requiring an extra space in the mechanism to accommodate actuating means. As a result production efficiency of the machine will be greatly lowered by spending too much labor force for calendering and caliberating the base.

SUMMARY OF THE INVENTION

The purpose of the present invention is to resolve the disadvantages of the commonly known technology described above such as low stiffness, high difficulty of assembly and lack in bearing heavier downward load and sufficient moment of inertia for the mechanism so as to provide a new type guide actuator.

In order to improve the disadvantages of the commonly known technology, the present invention utilizes the U-shape guide structure with redesigning. As the moment of inertia for a U shaped lamina structure with respect to a defined axis is greater than that of a rectangular lamina with siminar length of two edges to that of the U shaped structure, so that the moment of inertia of the structure will be improved. The direction of bearing force of the guide structure is changed to make the linear guide actuator have better stiffness and precision, such that the U shape guide structure has not only a sufficient bending moment but an anti-distortion stress and a radial direction load capability.

According to the present invention, the first pair of grooves are set at the center of the bottom of the U-shape guide structure, and a table is set between the two inner walls of both sides of the U-shape structure, and two grooves corresponding to the grooves on the U-shape structure are set at the bottom of the table with setting rollers therein to make the table enable to slide with respect to the U-shape guide structure with low friction according to rolling motion of the rollers. The intensity of the present invention is good because the bottom of the U-shape guide structure is directly locked on the base of the mechanical structure. Besides, the table and the grooves thereon, rollers, U-shape guide structure and the grooves thereon are arranged in alignment from the upside to the underside such that the direction of bearing force is identical to make the guide actuator with high radial direction load capability of the present invention have good ability of bearing load.

Rollers usually contain two kinds: balls and columns. The manufacturing cost of the front is lower than the latter, so balls are used commonly while columns can bear heavier load.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
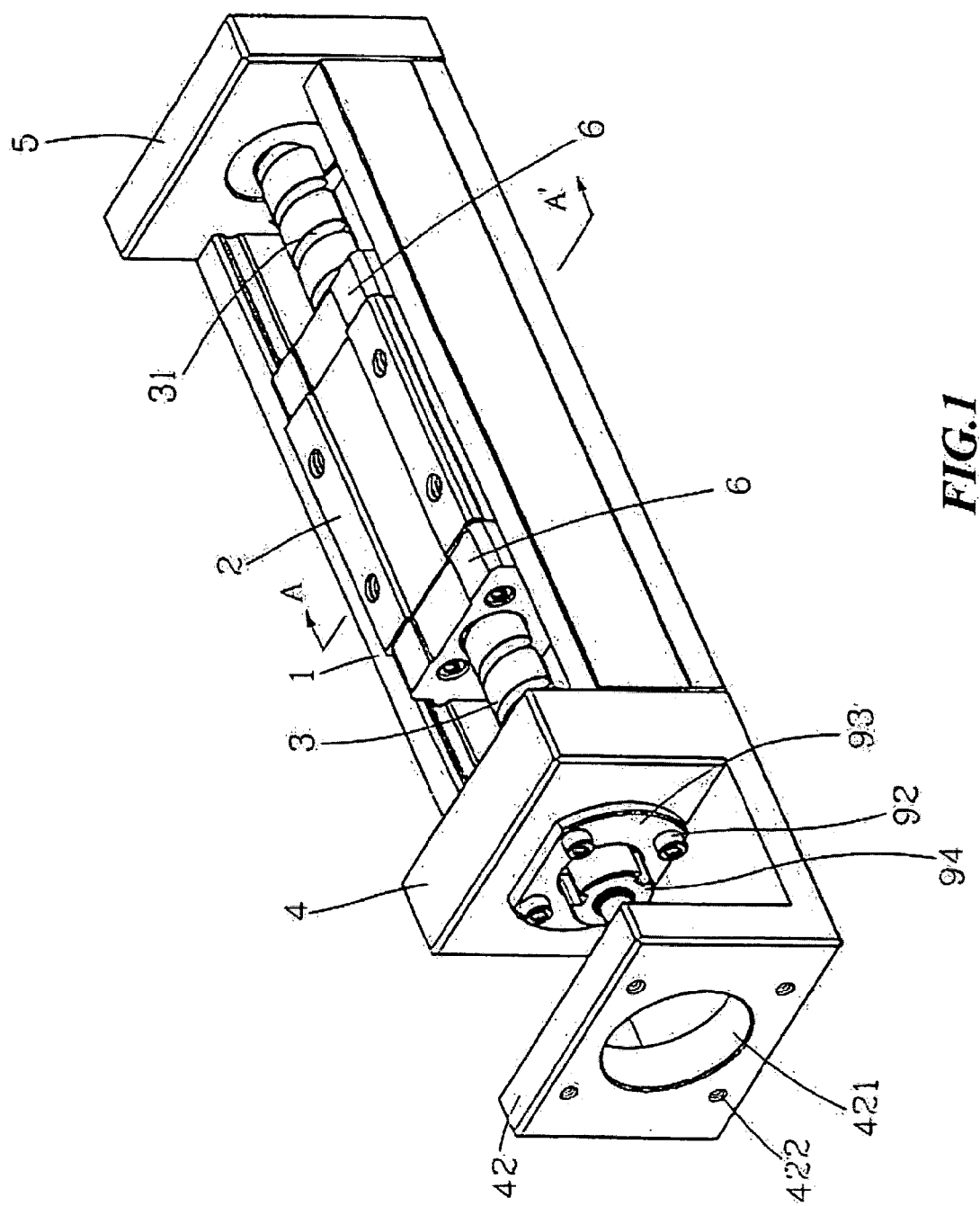
FIG. 1 is the three-dimensional schematic diagram of the guide actuator with high radial direction load capability of the present invention.

FIG. 1 is the schematic diagram of the guide actuator with high radial load capability. In the figure, the actuator uses a ball screw to transmit. Besides, a motor (not shown in figures) is locked on the motor seat (42) of the bearing seat (4), and screw holes (422) are used to be passed through by screws to fasten the motor. A hole (421) is used to be passed through by the output end portion of the motor. The screw (3) has threads (31), and both ends thereof are limited by the bearing seat (4) and the bearing seat (5). The left end of the screw (3) is positioned by screws (92), a bearing ring (93) and a locking nut (94), and can be connected to the motor fastened on the motor seat (42) with a coupling (not shown in figures). The rotation of the motor can drive the screw (3) to rotate such that the table (2) setting outside the screw (3) can move leftward or rightward due to that the internal threads of the table (2) is engaged with the threads (31) of the screw (3).

Figure 2:
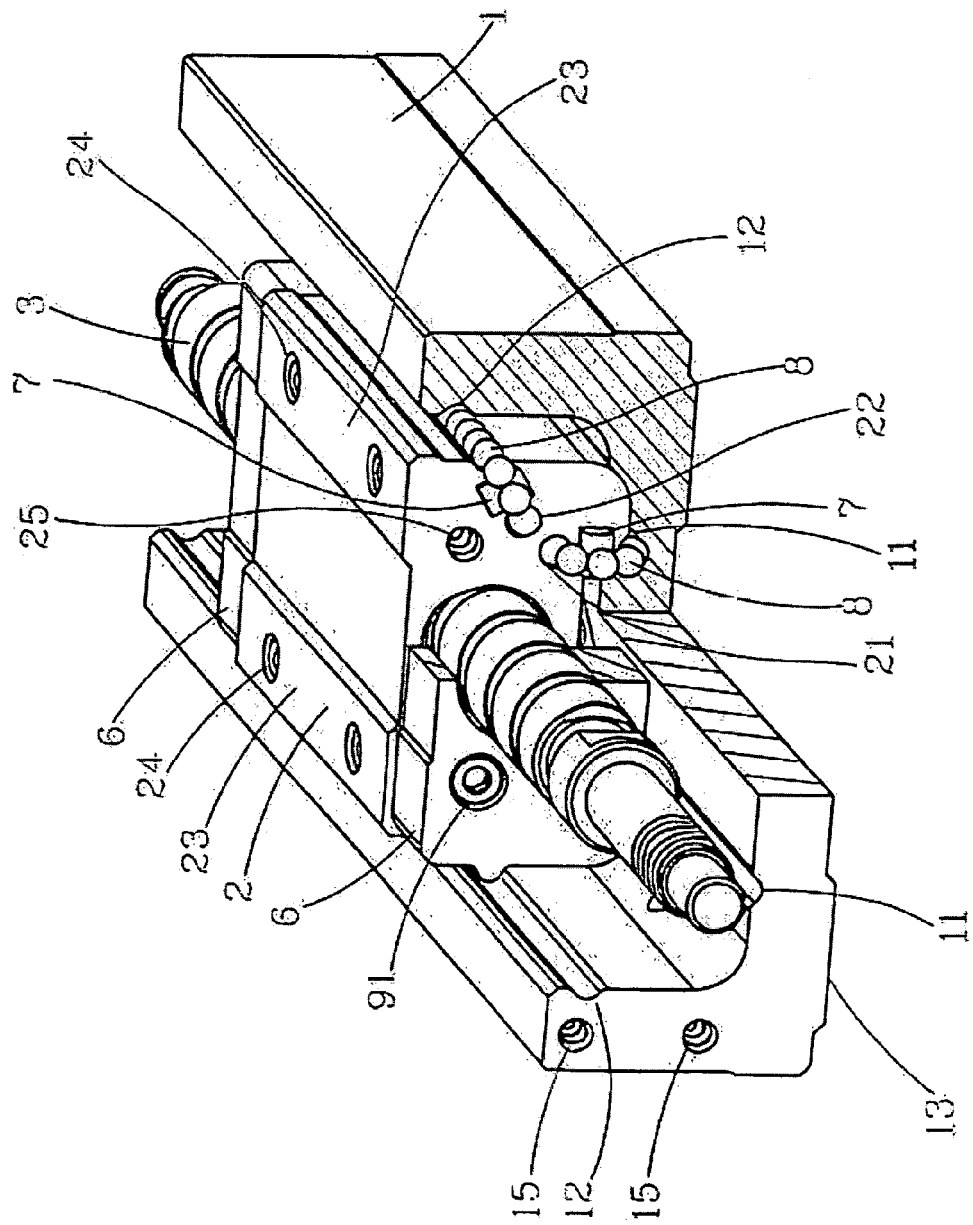
FIG. 2 is a partial sectional drawing of the FIG. 1.
Figure 3:
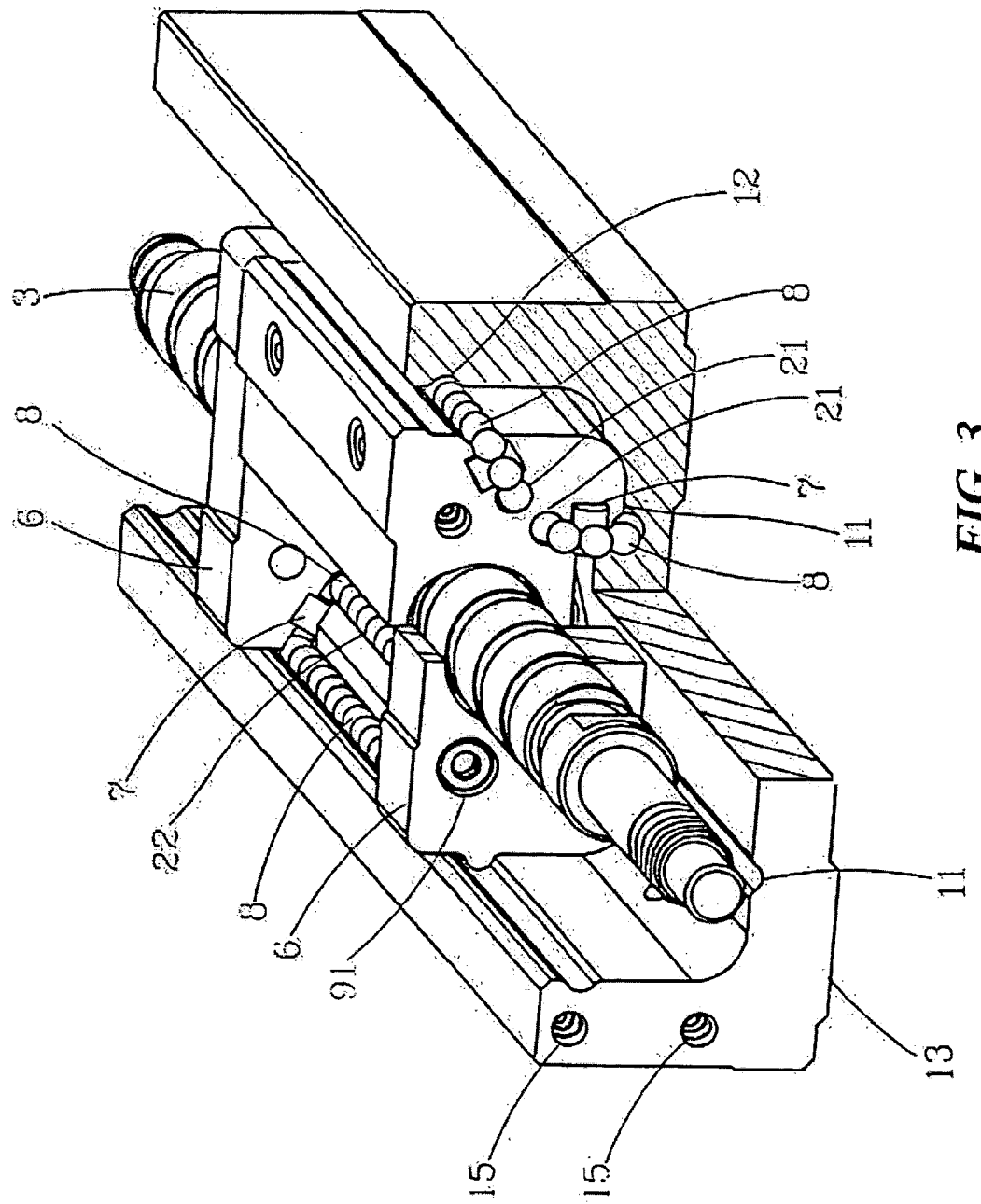
FIG. 3 is another partial sectional drawing of the FIG. 1.

FIG. 2 and FIG. 3 are partial sectional drawing of FIG. 1. In order to understand detailed structure of every part, the guide structure (1) and the end cap (6) are partially eliminate away and added hatches, and the left upper part of the table (2) is also eliminated away to understand the inside structure of the table (2). The guide structure (1) is a bar-like structure having a U-shape cross-section, and has two slender first grooves (11) set at the center of the bottom, and has two slender second grooves (12) at the inner wall of both sides. On the table (2), there are grooves (26) corresponding to the first grooves (11) and grooves (27) corresponding to the second grooves (12) of the guide structure (1). Steel balls (8) are set between the four grooves of the guide structure (1) and the four corresponding grooves of the table (2). The rolling motion of the steel balls (8) makes the guide structure (1) and the table (2) can slide respect to each other with low friction. In order to make the steel balls (8) can roll with circulation, circulating holes (21,22) passing through the table (2) are set to serve as the passages of the steel balls (8). Besides, semi-column-like guide blocks (7) are used to make the steel balls (8) have more smooth circulation. An end cap (6) is fastened at both ends of the table (2) by being locked at the fastening screw holes (25) with screws (91) to prevent the circulating steel balls from dropping. Assembling face (23) is used to combine with a mechanism wanted to move, and the assembling screw holes (24) are used for locking the mechanism wanted to move. Bearing seat screw holes (15) are used for combining with a bearing seat (4).

Figure 4:
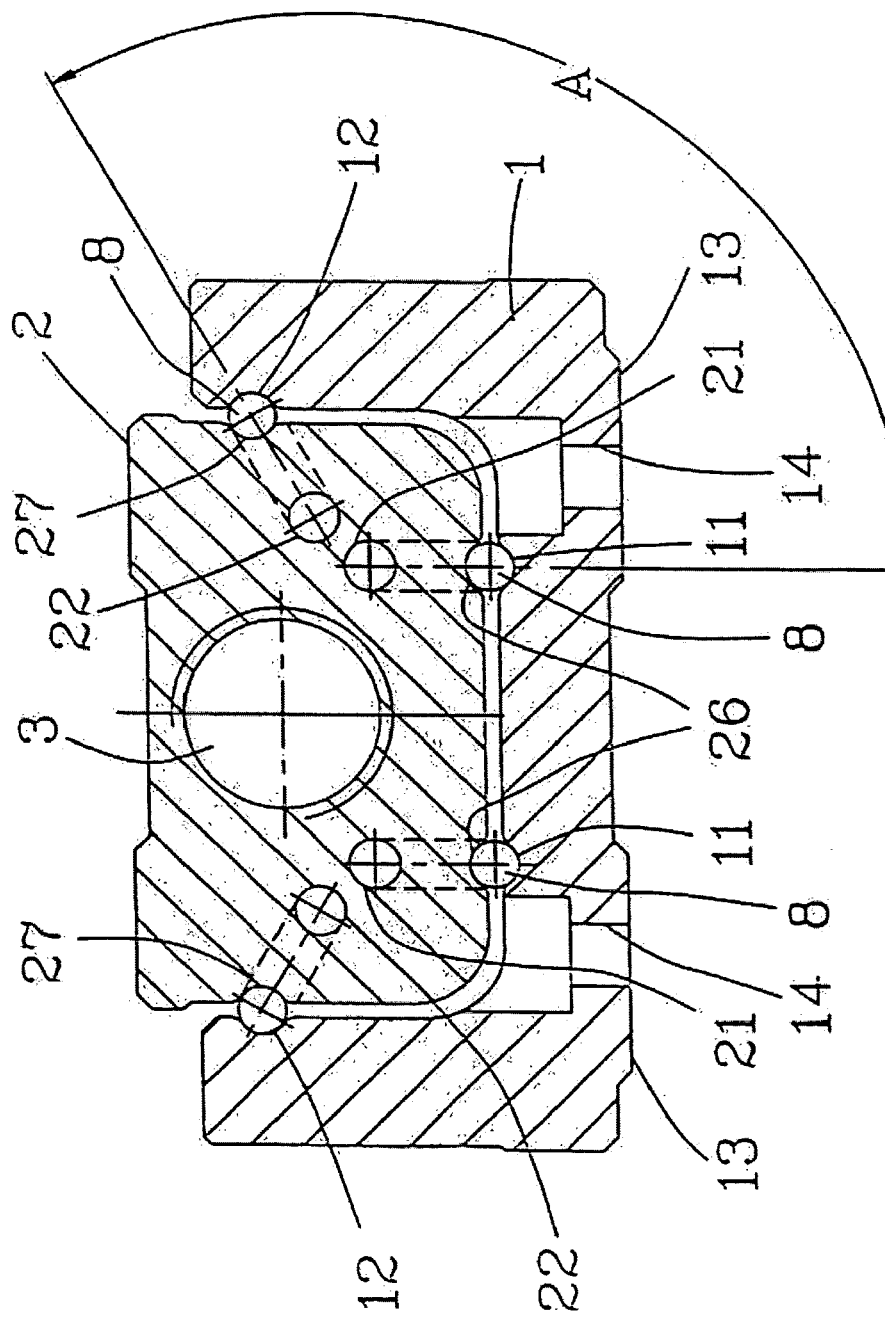
FIG. 4 is A–A' cross-section drawing.

FIG. 4 is the A–A' cross-sectional view of FIG. 1. In the figure, the guide structure (1) is a U-shape guide structure. In addition to the first two grooves (11) at the center of bottom of the table and second two grooves (12) at each inner wall of both side of the U-shape guide structure, the bottom surface (13) is used for combining with the mechanical base. Besides, there are setting holes (14) on the bottom so that the guide actuator with high radial load capability according to the present invention can be combined with the mechanical base. With the U-shape guide structure (1) and setting holes (14), the guide actuator with high radial load capability of the present invention is applied very conveniently. While the present invention is used, the user just places the guide actuator at the demanded position and fastened it by locking the screws at the setting holes (14). The feature of the present invention is the configuration of the grooves (11) of the guide structure (1) and the grooves (26) of the table (2). Because the screw (3) only has the function of bearing axial load, the load of objects placed on the table (2) is only borne by the grooves (11,12) and the steel balls (8). The guide actuator with high radial load capability according to the present invention has the grooves (11) at the bottom inside the U-shape guide structure to have best ability of bearing downward load in FIG. 4. If there is no groove (11) in FIG. 4, all weight of the borne objects is borne by the grooves (12). In this way, the force acting on the grooves (12) could result in lateral force to make the two sides of the U-shape guide structure (1) spread outward such that the whole table (2) may descend to affect the stiffness of the structure. The grooves (11) of the present invention can bear most load, and the distance between the groove (11) and the bottom surface (13) for assembling is short, and, besides, the whole structure is substantial, so the stiffness of the structure is good. In order to make the guide actuator of the present invention has good structure intensity in horizontal direction in additional to the normal direction, the angle A between the bearing direction of the groove of the side wall and the bearing direction of the groove of the bottom of the before mentioned U-shape guide structure is designed from 105° to 155° to make the linear guide actuator has good structure intensity not only in normal direction but also horizontal direction.

Suppose that A equals 120° and use balls with other design conditions same as that of the prior arts (U.S. Pat. No. 5,273,381, U.S. Pat. No. 5,277,498), the radial direction load capacity of the present embodiment can be increased 41% of that can be obtained from the prior art. In view of the fact that the durability of the mechanical components such as bearings is in propotion to three powers of the load capability, thus the life time of the mechanism of the present embodiment will be $2.82(1.414^3)$ times that of the prior arts.

Figure 5:
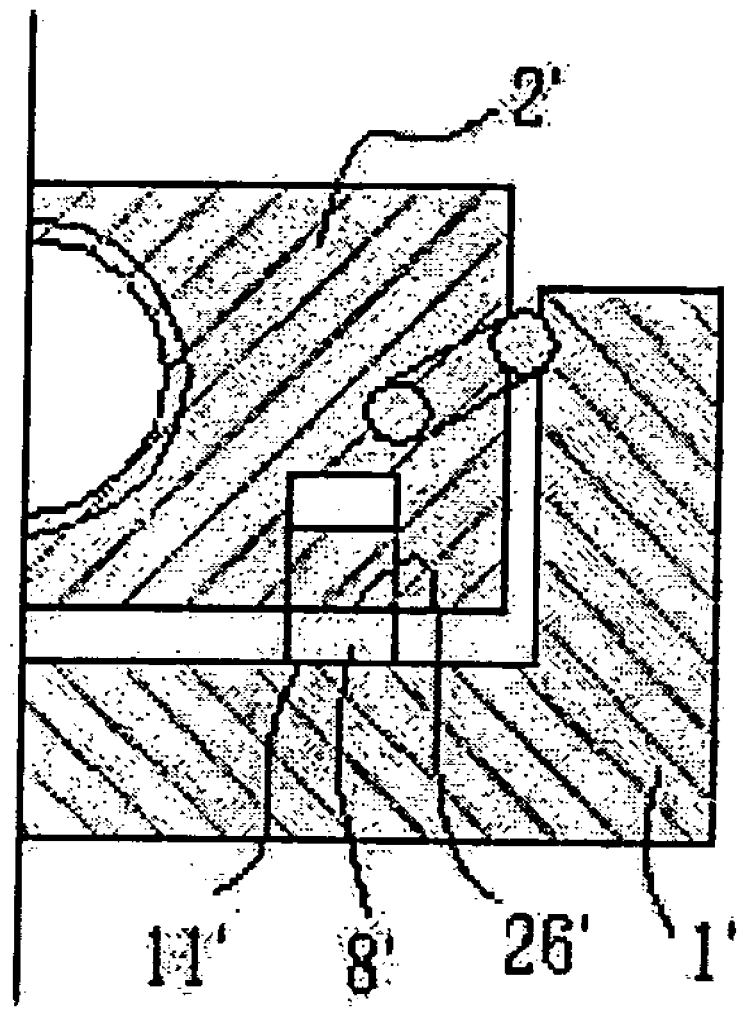
FIG. 5 is a sectional schematic diagram of guide actuators of prior art.
Figure 6:
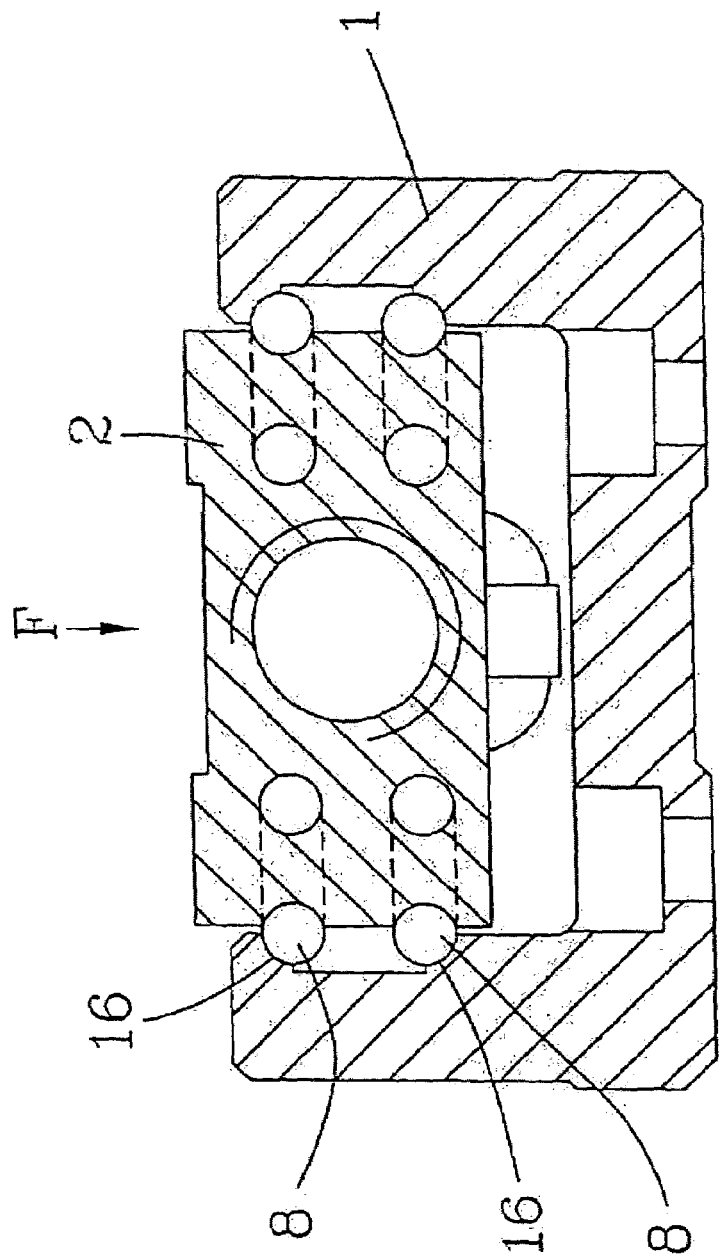
FIG. 6 is a sectional schematic diagram of guide actuators described in prior art devices.

FIG. 5 is a schematic view in which the roller is used as a rolling element. In this embodiment, the cylindrically structured roller forms the groove 11' of the U-shape guide structure (1') into a plane so that the grinding of the groove 11' can be performed directly applying the planar grinding. Further to this the groove 26' of the entraining table 2' is also a plane so that the aforesaid planar grinding can also be directly applied to grind the groove 26' thereby facilitating the fabrication process. Besides, the contact surface between a roller 8' and the grooves 11', 26' is far greater than that between the ball and the grooves 11', 26'. As a result, the radial direction load capacity in this embodiment can be further improved than that when balls are used. Therefore it is concluded that using the roller is not only facilitating fabrication of the mechanism, but also significantly improves the radial direction load capability.

Many changes and modifications in the above described embodiment if the invention can, of course, be carried out without departing from the scope thereof. Accordingly, to promote the progress in science and the useful arts, the invention is disclosed and is intended to be limited only by the scope of appended claims.

What is claimed is:

1. A guide actuator with high radial direction load capability at least comprising a guide structure, a table, and a actuating structure, wherein:

said guide structure is bar-like in appearance and U-shape in cross section, so that to modify the moment of inertia of said guide structure, a first grooves respectively being set at a bottom inside of U-shape, a second grooves being set at an inner wall of each side of U-shape;

said actuator structure provides said table with power for moving;

said table is set between said inner wall of each side of said U-shape guide structure and length of said table is shorter than that of said U-shape guide structure, two grooves being set corresponding to said first grooves at said bottom and said second grooves at said inner walls respectively, a plurality of rollers being set between said first, second grooves of said guide structure and said corresponding two grooves of said table, a mechanism for circulation of rolling motion of said rollers being set at a front end and an rear end of said table to make said table enable to slide along said first and second grooves of said guide structure, wherein the angle formed between the direction of on exerted force onto the groove formed along the side wall of said U-shape guided structure and the direction of an exerted force onto the groove formed along the inner bottom side at the middle part of said U-shape guide structure is 105°~155°.

2. A guide actuator with high radial direction load capability according to claim 1, wherein said actuating structure is a screw, a plurality of threads corresponding to said screw being set on said table.

3. A guide actuator with high radial direction load capability according to claim 2, wherein said screw is a ball screw.

4. A guide actuator with high radial direction load capability according to claim 1, wherein a plurality of setting holes are set at a bottom surface of said U-shape guide structure so that said guide actuator with high radial direction load capability could be locked to a mechanical base.

5. A guide actuator with high radial direction load capability according to claim 1, wherein said rollers include a plurality of balls and a plurality of columns.

* * * * *